US012000381B2

United States Patent
Nichols et al.

(10) Patent No.: US 12,000,381 B2
(45) Date of Patent: Jun. 4, 2024

(54) REDUCING PEAK OUT-OF-VERTICAL LOADS IN A WIND TURBINE

(71) Applicant: VESTAS WIND SYSTEMS A/S, Aarhus N. (DK)

(72) Inventors: James Alexander Nichols, Aarhus C (DK); Jacob Deleuran Grunnet, Tranbjerg J (DK); Anders Steen Nielsen, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/779,426

(22) PCT Filed: Nov. 24, 2020

(86) PCT No.: PCT/DK2020/050325
§ 371 (c)(1),
(2) Date: May 24, 2022

(87) PCT Pub. No.: WO2021/104589
PCT Pub. Date: Jun. 3, 2021

(65) Prior Publication Data
US 2022/0412306 A1     Dec. 29, 2022

(30) Foreign Application Priority Data

Nov. 25, 2019 (DK) ............................ PA 2019 70719

(51) Int. Cl.
*F03D 7/02*     (2006.01)
(52) U.S. Cl.
CPC ........... *F03D 7/028* (2013.01); *F03D 7/0224* (2013.01)

(58) Field of Classification Search
CPC .............................. F03D 7/0224; F03D 7/028
See application file for complete search history.

(56) References Cited

U.S. PATENT DOCUMENTS

| 2005/0121214 | A1 | 6/2005 | Gould |
| 2009/0129924 | A1* | 5/2009 | Rebsdorf ................ F03D 17/00 |
| | | | 416/43 |

FOREIGN PATENT DOCUMENTS

| CA | 3074399 A1 | 3/2019 |
| CN | 107709766 A | 2/2018 |
| EP | 2060785 A1 | 5/2009 |
| EP | 2112376 A2 | 10/2009 |
| EP | 2593671 A2 | 5/2013 |
| EP | 3587803 A1 | 1/2020 |

(Continued)

OTHER PUBLICATIONS

Danish Patent and Trademark Office, 1st Technical Examination including The Search Report and Search Opinion for Application PA 2019 70719 dated Jun. 4, 2020.

(Continued)

*Primary Examiner* — Tulsidas C Patel
*Assistant Examiner* — Thomas K Quigley
(74) *Attorney, Agent, or Firm* — Patterson + Sheridan, LLP

(57) ABSTRACT

A method of controlling a wind turbine is provided, comprising identifying an out-of-vertical load acting in a first direction on the wind turbine. A direction of a wind load acting on the wind turbine is determined. If there is a degree of alignment between the direction of the wind load and the first direction, the wind turbine is controlled to reduce the wind load.

20 Claims, 2 Drawing Sheets

(56) References Cited

FOREIGN PATENT DOCUMENTS

| | | |
|---|---|---|
| WO | 2018101833 A1 | 6/2018 |
| WO | 2021104589 A1 | 6/2021 |

OTHER PUBLICATIONS

PCT, International Search Report for Application PCT/DK2020/050325 dated Feb. 24, 2021.
PCT, Written Opinion of The International Searching Authority for Application PCT/DK2020/050325 dated Feb. 24, 2021.

* cited by examiner

REDUCING PEAK OUT-OF-VERTICAL LOADS IN A WIND TURBINE

FIELD OF THE INVENTION

The present invention relates to a method of controlling a wind turbine, and in particular to a method of controlling a wind turbine to reduce an out-of-vertical load.

BACKGROUND OF THE INVENTION

During operation wind turbines experience a wind load in an out-of-vertical direction (i.e. at an angle to an axis defined by the length of the turbine's tower) due to the force of the wind, and in particular due to the force of the wind interacting with the turbine's blades. In addition, a wind turbine may have inherent out-of-vertical loads due to inaccuracies in build or installation. For example, the tolerances in the building of the turbine's foundation may lead to the turbine to have a slight lean, causing an out-of-vertical load. Additionally, the sun may heat one side of the turbine, causing an out-of-vertical load due to the expansion of the heated side.

Conventionally, turbine towers are designed and constructed to withstand such out-of-vertical loads. Indeed, national design standards for turbines tend to require that potential, non-wind, out-of-vertical loads are accounted for in the simulations used for designing the tower. As a result, towers are constructed to be stronger than they would otherwise need to be, increasing the cost of tower construction.

SUMMARY OF THE INVENTION

A first aspect of the invention provides a method of controlling a wind turbine comprising:
  identifying an out-of-vertical load acting in a first direction on the wind turbine;
  determining a direction of a wind load acting on the wind turbine:
  determining whether there is a degree of alignment between the direction of the wind load and the first direction; and
  if so, controlling the wind turbine to reduce the wind load.

In some embodiments, the out-of-vertical load may comprise a solar-induced out-of-vertical load.

In some such embodiments, identifying the out-of-vertical load may comprise calculating the solar induced out-of-vertical load based on the turbine location and current time. Alternatively or additionally, identifying the out-of-vertical load may comprise calculating the solar induced out-of-vertical load based on a measurement from a meteorological sensor associated with the wind turbine.

In some embodiments, the out-of-vertical load may comprise an inherent imbalance acting on the wind turbine.

In some embodiments, determining whether there is a degree of alignment between the direction of the wind load and the first direction may comprise determining whether a component of the direction of the wind load lies in the first direction.

In some embodiments, the method may further comprise:
  determining if the wind load exceeds a wind load threshold; and
  controlling the wind turbine to reduce wind load if:
    there is a degree of alignment between the direction of the wind load and the first direction; and
    the wind load exceeds the wind load threshold.

In some embodiments, the method may comprise:
  determining a total load acting in the first direction, wherein the total load is a sum of the out-of-vertical wind load and a component of the wind load acting in the first direction;
  determining if the total load exceeds a total load threshold; and
  controlling the wind turbine to reduce the wind load if the total load exceeds the total load threshold.

In some embodiments, identifying the out-of-vertical load may comprise:
  monitoring a position of a first point at a base of the wind turbine, and a second point on a nacelle of the wind turbine; and
  calculating the out-of-vertical load based on a difference between the position of the first point and the second point.

In some embodiments, identifying the out-of-vertical load may comprise determining a vector sum of a plurality of out-of-vertical loads.

In some embodiments, controlling the wind turbine to reduce the wind load may comprise adjusting a pitch of at least one blade of the wind turbine.

In some embodiments, controlling the wind turbine to reduce the wind load may comprise adjusting a power output by the wind turbine.

In some embodiments, controlling the wind turbine to reduce wind load may comprise:
  providing the determined wind load as an input in a model of expected wind turbine behaviour;
  extracting control parameters from the model which reduce the wind load acting on the wind turbine; and
  controlling the wind turbine in accordance with the control parameters.

A second aspect of the invention provides a wind turbine control system comprising:
  a wind load block configured to determine a wind load acting on a wind turbine;
  and a controller configured to receive the wind load from the wind load block;
  wherein the controller is configured to control the wind turbine in accordance with the method of any embodiment of the first aspect.

A third aspect of the invention provides a wind turbine comprising a wind turbine control system according to the second aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
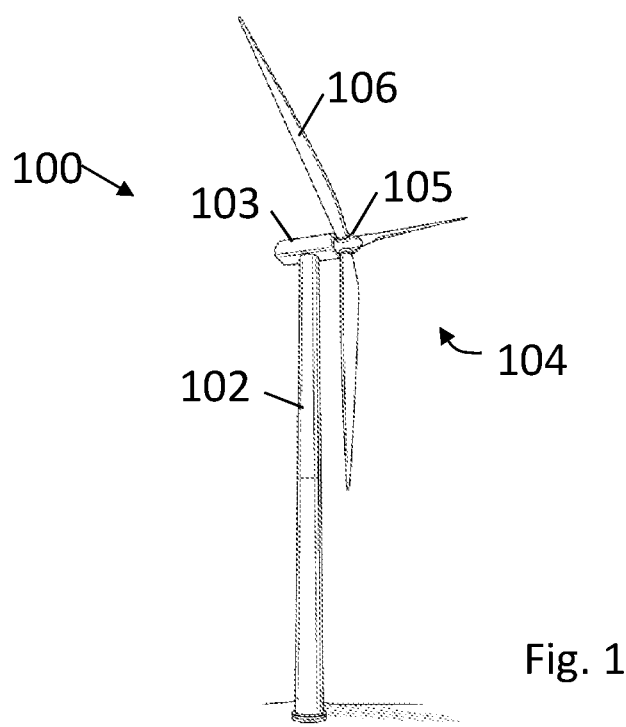
FIG. 1 schematically illustrates a wind turbine.

FIG. 1 illustrates, in a schematic perspective view, an example of a wind turbine 100. The wind turbine 100 includes a tower 102, a nacelle 103 at the apex of the tower, and a rotor 104 operatively coupled to a generator housed inside the nacelle 103. In addition to the generator, the nacelle houses miscellaneous components required for converting wind energy into electrical energy and various components needed to operate, control, and optimize the performance of the wind turbine 100. The rotor 104 of the wind turbine includes a central hub 105 and a plurality of blades 106 that project outwardly from the central hub 105. In the illustrated embodiment, the rotor 104 includes three blades 106, but the number may vary. Moreover, the wind turbine comprises a control system. The control system may be placed inside the nacelle or distributed at a number of locations inside the turbine and communicatively connected.

The wind turbine 100 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
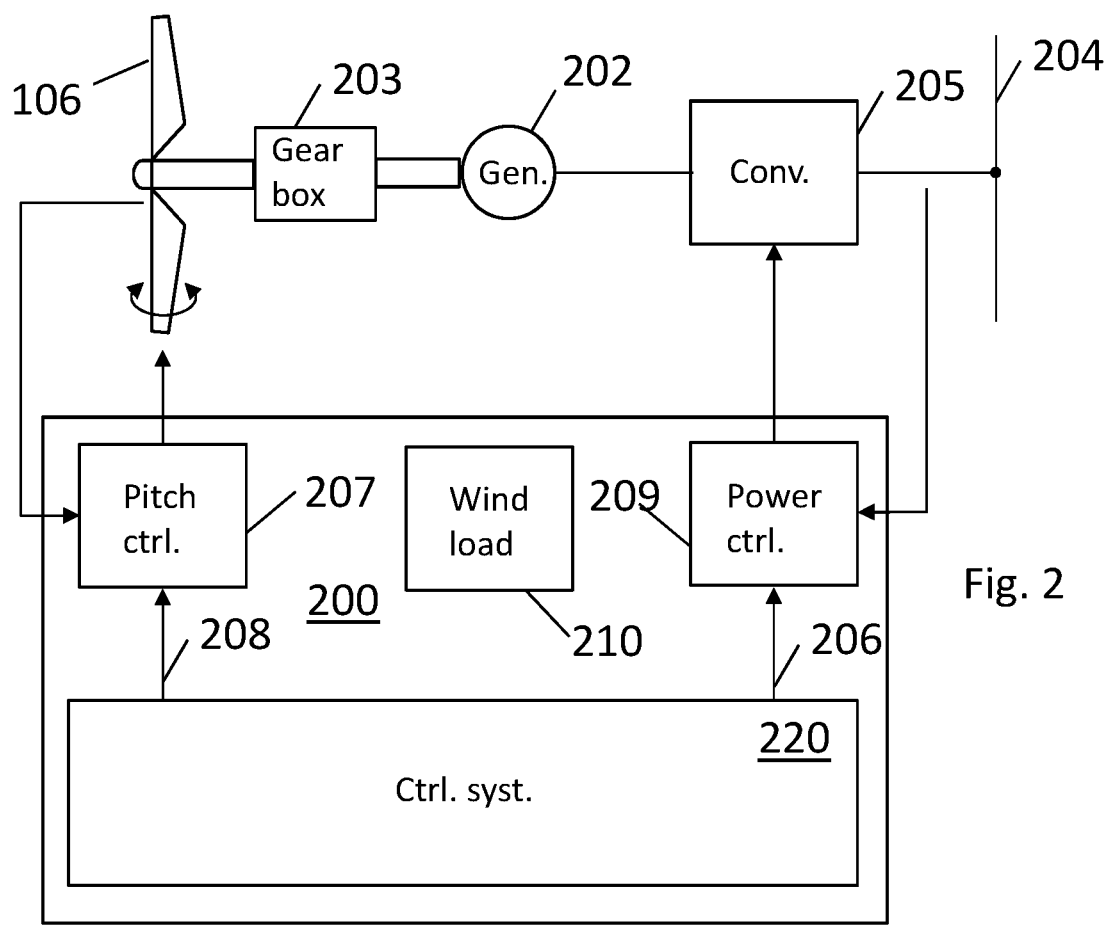
FIG. 2 schematically illustrates a control system of a wind turbine.

FIG. 2 schematically illustrates an embodiment of a control system 200 together with elements of a wind turbine. The wind turbine comprises rotor blades 106 which are mechanically connected to an electrical generator 202 via gearbox 203. In direct drive systems, and other systems, the gearbox 203 may not be present. The electrical power generated by the generator 202 is injected into a power grid 204 via an electrical converter 205. The electrical generator 202 and the converter 205 may be based on a full scale converter (FSC) architecture or a doubly fed induction generator (DFIG) architecture, but other types may be used.

The control system 200 comprises a number of elements, including at least one main controller 220 with a processor and a memory, so that the processor is capable of executing computing tasks based on instructions stored in the memory. In general, the wind turbine controller ensures that in operation the wind turbine generates a requested power output level. This is obtained by adjusting the pitch angle of the blades 106 and/or the power extraction of the converter 205. To this end, the control system comprises a pitch system including a pitch controller 207 using a pitch reference 208, and a power system including a power controller 209 using a power reference 206. The wind turbine rotor comprises rotor blades that can be pitched by a pitch mechanism. The rotor comprises an individual pitch system which is capable of individual pitching of the rotor blades, and may comprise a common pitch system which adjusts all pitch angles on all rotor blades at the same time. The control system 200 further comprises a wind load block 210, configured to determine a direction (and optionally magnitude) of a wind load acting on the wind turbine, as discussed below. The wind load block may be part of main controller 220. The control system, or elements of the control system, may be placed in a power plant controller (not shown) so that the turbine may be operated based on externally provided instructions.

Ideally, wind turbine 100 would constructed so that the tower 102 is perfectly aligned with gravity. In practice, however, turbine 102 is likely to have a slight lean as it is not possible to construct the foundations of the turbine and the tower itself with sufficient precision to achieve perfect alignment. Even after construction, there may be subsidence of the foundations, or shifts in soil stiffness that induce leaning away from the ideal position. The tower 102 may also be warped by solar heating, where one side/part of the tower 102 is heated by the sun and expands.

Each of these effects creates an out-of-vertical load that the tower 102 has to bear. The tower 102 is primarily designed to withstand loads in the vertical direction (i.e. along the axis defined by the length of the tower), mostly due to the weight of the nacelle 105 and blades 106. The out-of-vertical loads create an additional burden on the tower 102 that must be accounted for. Conventionally, potential out-of-vertical loads for a planned turbine 100 are modelled during the design state, and the tower 102 design is strengthened to withstand any out-of-vertical loads that the turbine 100 may face during its lifetime. However, such tower strengthening is costly both financially and in terms of materials used.

Figure 3:
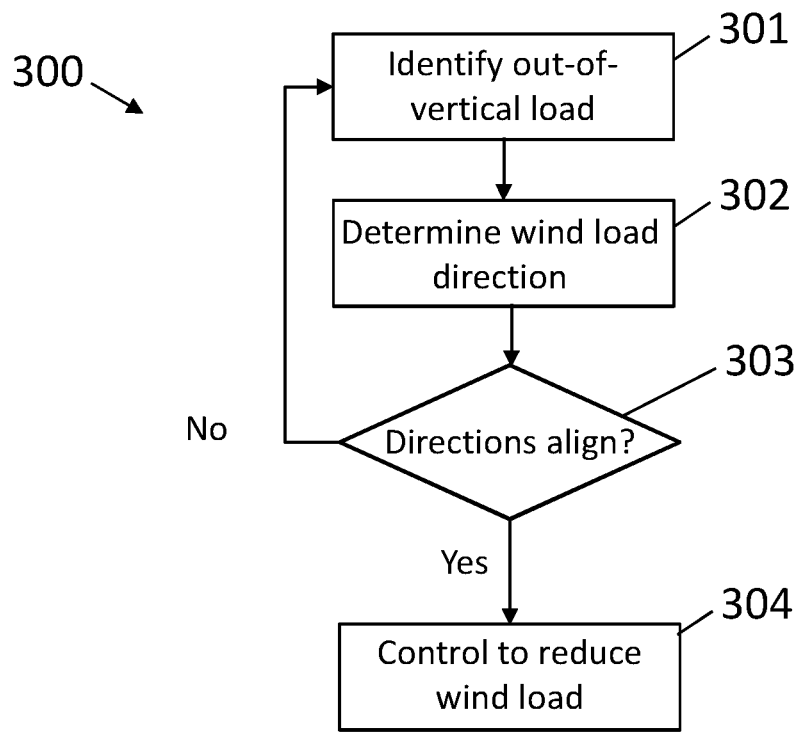
FIG. 3 illustrates a method of reducing an out-of-vertical load on a wind turbine.

FIG. 3 illustrates a method 300 that may be used to reduce the amount of tower strengthening needed for out-of-vertical loads. Method 300 makes use of the realisation that out-of-vertical loads are most problematic when they align with the wind load.

The wind load is primarily caused by the force of the wind interacting with the blades 106, and can be considered a vector with a direction determined by the current direction of the wind, and a magnitude dependent upon the current speed of the wind at the turbine 100. Similarly, the out-of-vertical load currently experienced by the turbine (i.e. the non-wind out-of-vertical load) may be considered a vector that is the vector sum of the different out-of-vertical loads acting on the turbine, for example due to the effects discussed above.

When the wind load vector is aligned or substantially aligned (or as discussed further below, has a component aligned) with the out-of-vertical load vector, the tower 102 experiences a peak out-of-vertical loading. Conventionally the tower 102 would be strengthened to withstand such peak loads. However, this extra strength is unnecessary most of the time, when wind load and out-of-vertical load are not aligned. Method 300 instead controls the turbine 100 to reduce the wind load at times when wind load and out-of-vertical loads are aligned, avoiding the peaks in total load. As a result, the extra strengthening of the tower to cope with peak out-of-vertical loading is not necessary.

Method 300 starts at step 301, at which an out-of-vertical load (i.e. a non-wind out-of-vertical load) is identified acting on the wind turbine 100 in a first direction.

The out-of-vertical load may be caused by any of the factors discussed above. In particular, it may be an inherent out-of-vertical load such as a load due to installation tolerances in the foundation, manufacturing tolerances in the tower, or (semi-permanent) subsidence of the foundation during operation; or may be a dynamic out-of-vertical load such as solar warping, or changes in soil stiffness during operation of the turbine 100. The out-of-vertical load may be a vector sum of a plurality of different loads.

Identifying the out-of-vertical load may comprise identifying an earlier determined out-of-vertical load, for example looking up an out-of-vertical load in a memory associated with the wind turbine 100. This may particularly be used for inherent out-of-vertical loads, which are likely to remain constant over a long period of time. Alternatively or additionally, identifying the out-of-vertical load may comprise determining a current out-of-vertical load, such as a current solar warping. Where the out-of-vertical load comprises a plurality of loads, step 301 may comprise both looking up an earlier identified load (e.g. inherent lean) and determining a current load (e.g. solar warping). Methods of identifying the out-of-vertical load are discussed in more detail below.

At step 302 of method 300, a direction of the current wind load is determined. The direction of the wind (and hence of the wind load) may for example be determined based on the current yaw position of the nacelle 105, which is positioned to face into the wind. In some embodiments, the magnitude of the wind load may be determined as well as the direction of the wind load. One or more sensors of the wind turbine 100 may be used to determine the wind load, such as an anemometer and/or wind vane. The wind load exerted by the wind on the turbine 100 may be calculated from the wind speed and direction, based on known properties of the turbine 100 (such as blade area, pitch angle etc.). Alternatively the wind direction and wind speed may be used as a proxy to the wind load direction and magnitude in the remaining method 300.

At step 303, it is determined if there is a degree of alignment between the wind load direction and the first direction. Determining that there is a degree of alignment may comprise determining if an angle between the wind load direction and the first direction falls within a predetermined range, for example 0°-70°, 0°-50°, or 0°-30°. In particular, the angle may be the angle between the components of the out-of-vertical load and the wind load in the horizontal plane (i.e. the plane orthogonal to the length of the tower 102). Alternatively, determining whether there is a degree of alignment may comprise determining whether a vector component of the direction of the wind load lies in the first direction.

As discussed above, if there is an alignment between the wind load direction and the out-of-vertical loads, the turbine 100 will be under peak stress. Thus if it is determined in step 303 that there is a degree of alignment between the wind load direction and first direction, the method 300 proceeds to step 304. At step 304, the wind turbine 100 is controlled to reduce the wind load experienced by the turbine, as discussed in more detail below. If, on the other hand, there is no (or insufficient) degree of alignment between the wind load direction and first direction, no change to the operation of the wind turbine is made. The method 300 then returns to step 301, for example after a predetermined time period or detected change in wind conditions.

Returning to step 304, controlling the wind turbine 100 to reduce the wind load may comprise controlling the pitch of the blades 106 to reduce the aerodynamic interaction between the blades 106 and the wind. In particular, pitch controller 207 may be used to reduce the pitch, for example upon receipt of a signal from the main controller 220 indicative of the pitch change necessary to reduce the wind load. In particular embodiments, control system 200 may comprise a variable thrust limiter configured to control the thrust of the wind on the turbine 100 by varying the pitch of the blades 106. Such a variable thrust limiter may be used to reduce the wind load in step 304.

Alternatively or additionally, controlling the wind turbine 100 to reduce the wind load may comprise adjusting a power output by the wind turbine 100 (e.g. the power extracted to the grid 204), for example using power controller 209. Controlling the output power of the turbine 100 controls the power extracted by the turbine 100 from the wind, and so controls the wind load experienced by the turbine 100.

In some embodiments, the turbine 100 may be controlled in accordance with a model of expected turbine behaviour given current and expected circumstances (e.g. model predictive control, MPC). In such embodiments, the current wind load (and/or current wind speed and direction) may be provided as an input into the model. The model may then provide control parameters for the wind turbine which reduce the wind load, and the turbine 100 may be controlled in accordance with those control parameters. For example the control parameters may set pitch and/or power settings for the turbine 100.

In any case, the wind turbine 100 may be controlled to reduce the wind load to a desired amount. The desired amount may be a predetermined magnitude threshold, or may vary, for example based on the degree of alignment between the direction of the wind load and the first direction. In particular, the desired reduction may dependent on the magnitude of the component of the wind load acting in the first direction. In such cases, the wind turbine 100 may be controlled to reduce that component of the wind load to zero, approximately zero, or another predetermined value.

As set out above, method 300 is primarily concerned with the direction of the wind load, and identifying whether that direction has a degree of alignment with the first direction, i.e. the direction of the out-of-vertical load (or direction of the vector sum of out-of-vertical loads). Some embodiments may factor in the magnitude of the wind load as well as direction when determining whether to control the turbine 100 to reduce the wind load.

For example, step 303 may further comprise determining if the wind load exceeds a wind load threshold. For example, the total magnitude of the wind load may be compared to a threshold; or the magnitude of the component of the wind load in the first direction may be compared to a threshold. The wind turbine is then controlled to reduce the wind load at step 304 only if there is a degree of alignment between the direction of the wind load and the first direction; and the wind load exceeds the wind load threshold. In such embodiments, the wind turbine is controlled only if the magnitude and alignment of the wind load is likely to overburden the tower 102. This is useful, as controlling the turbine to reduce wind loads is likely to reduce the power generated by the turbine 100, so it is preferably to only reduce the wind load when strictly necessary.

Alternatively, method 300 may comprise determining a total load acting in the first direction, rather than just the wind load. Here, the total load is a sum of the out-of-vertical wind load acting in the first direction and a component of the wind load acting in the first direction. It is then determined whether the total load exceeds a total load threshold. The turbine 100 is then controlled to reduce the wind load only if the total load exceeds the total load threshold. In this way, the magnitude of both the wind load and the out-of-vertical load is considered when deciding whether to control the turbine to reduce the wind load, and hence reduce turbine power generation. This may be particularly useful where the out-of-vertical load is or comprises a dynamic load, such as a solar-induced load. In such cases the magnitude of the out-of-vertical load may vary significantly over time. Considering the total load means that turbine power output may not be affected when the out-of-vertical magnitude is currently low, even where the wind load is substantially aligned with the first direction.

Method 300 may be particularly suited to reducing stress on a turbine 100 when wind load substantially aligns with a solar-induced out-of-vertical load. Wind turbines are sited in exposed positions, so typically fully exposed to the sun. Solar radiation heats up the part of the tower 102 facing the sun, causing the material of the tower 102 to expand. On the other hand, material on the opposite side of the tower 102 does not expand, resulting in a predominantly out-of-vertical load across the tower 102. As the position of the sun changes during the day, the direction of this solar load changes. Similarly, as the strength of the solar radiation changes with time of day or cloud cover, the magnitude of the solar load changes. Thus the solar load experienced by a turbine 100 changes dynamically throughout the day.

The direction (and optionally the magnitude) of the solar-induced load may be calculated based on the turbine location and the current time. From these factors, the position of the sun in the sky can be calculated, and hence the direction of the solar-induced load determined. From the time of year, and/or a weather forecast, the likely strength (or likely maximum strength, e.g. assuming a cloudless sky) of the sun can be determined, and so the magnitude of the solar load can be calculated. Alternatively or additionally, one or more meteorological sensors such as a temperature sensor, light sensor, or precipitation sensor may be used to determine the direction and/or strength of the solar radiation, and hence the direction and/or magnitude of the solar-induced load. Such sensors may be attached to the wind turbine 100, or may be located nearby, for example in the wind park.

In particular embodiments, the solar-induced load may be calculated by estimating the effect of solar radiation. The magnitude and direction of solar radiation may be estimated from the time of day, or using a light sensor on or associated with the wind turbine 100. An increase in the temperature of the radiated parts of the tower 102 can then be determined. For example, the area of the tower 102 illuminated by the sun may be calculated from the direction of the radiation and the shape of the tower 102. The increase in temperature may then be calculated using a thermodynamic model of the tower 102 based on the ambient temperature and the magnitude and area of the solar radiation. Here, the ambient temperature is the temperature as measured by a temperature sensor not directly heated by the solar radiation, which may be on or associated with the wind turbine 100. In alternative embodiments, a plurality of temperature sensors placed at different locations on the tower 102 may be used to determine the temperature increase of the radiated parts of the tower 102 over the ambient temperature. In either case, once the temperature increase has been determined, the expansion of the heated parts of the tower 102 can be calculated based on the thermal expansion properties of the material of the tower 102, and so the resultant curvature and hence solar-induced load acting on the tower can be calculated. The load may for example be calculated using a finite element analysis; or once the curvature has been determined, integrating this to find the deflection as a function of height and the resulting gravitational load from the weight of the tower and rotor-nacelle-assembly.

Where method 300 is performed based solely on solar loading, the direction determined by such processes is the first direction. Alternatively, if other out-of-vertical loads such as inherent loads are also considered, a vector sum of the solar load and the other out-of-vertical loads is performed, to determine the direction of the resultant out-of-vertical load, which is used as the first direction.

Other dynamic loads acting on the wind turbine 100 may be or may form part of the out-of-vertical load in method 300. In particular, an out-of-vertical load may be induced in the tower 102 by dynamic changes in the stiffness of the soil around the turbine's foundations. Such changes may be caused by the load exerted by the turbine on the soil, and may occur rapidly, e.g. during the course of a day, or may occur more slowly. Such dynamic soil stiffness may have to be accounted for in certain country specific turbine standards, requiring extra tower 102 strength. Using method 300 may reduce the need for such precautions when constructing the turbine 100.

In addition to such dynamic loads, the tower 102 may also experience inherent (i.e. permanent or semi-permanent) loads. In particular, the tower 102 may have been constructed with a tilt relative to horizontal ground, either due to manufacturing tolerances in the material of the tower 102, or manufacturing tolerances in the construction of the foundations. The turbine 100 may experience an additional tilting during its lifetime due to subsidence of the foundation during turbine operation. The direction and/or magnitude of such inherent tilting may be identified using the nacelle tilt sensor in the nacelle 103. The nacelle tilt may be recorded for a plurality of yaw positions when wind speed is low (e.g. a full revolution of the nacelle may be performed, and a plurality of tilt measurements taken). An inherent tilt may be detected from these measurements in conjunction with a model of the tower 102. Such measurements may be repeated periodically, for example once a year, to identify any changes in the inherent tilt.

Any of these out-of-vertical loads may also be identified using high-precision GPS measurements. A first GPS sensor may be positioned at the base of the tower 102, and a second GPS sensor may be positioned on the nacelle 103. By monitoring the relative position of the first and second sensors, tilting of the turbine may be identified. As the wind load is likely to cause tilting, such measurements may be able to detect the total load acting on the wind turbine, discussed above. If the absolute position of the GPS sensors on the turbine 100 is known, this method may also be used to detect inherent out-of-vertical loads immediately after construction of the wind turbine.

Any or all of the out-of-vertical loads discussed above may be identified and controlled for using method 300. The above list is not intended to be exhaustive, any other out-of-vertical load in the tower 102 may also be used in method 300.

Although the invention has been described above with reference to one or more preferred embodiments, it will be appreciated that various changes or modifications may be made without departing from the scope of the invention as defined in the appended claims.

The invention claimed is:

1. A method of controlling a wind turbine comprising:
   identifying an out-of-vertical load acting in a first direction on the wind turbine;
   determining a direction of a wind load acting on the wind turbine;
   determining whether there is a degree of alignment between the direction of the wind load and the first direction; and
   when there is a degree of alignment between the direction of the wind load and the first direction, controlling the wind turbine to reduce the wind load, and
   wherein the out-of-vertical load comprises a solar-induced out-of-vertical load caused by solar radiation heating of the wind turbine.

2. The method of claim 1, wherein identifying the out-of-vertical load comprises calculating the solar-induced out-of-vertical load based on a turbine location and current time.

3. The method of claim 2, wherein identifying the out-of-vertical load comprises calculating the solar-induced out-of-vertical load based on a measurement from a meteorological sensor associated with the wind turbine.

4. The method of claim 1, wherein the out-of-vertical load comprises an inherent imbalance acting on the wind turbine.

5. The method of claim 1, wherein determining whether there is a degree of alignment between the direction of the wind load and the first direction comprises determining whether a component of the direction of the wind load lies in the first direction.

6. The method of claim 1, wherein the method further comprises:

determining if the wind load exceeds a wind load threshold; and controlling the wind turbine to reduce wind load if:
  there is a degree of alignment between the direction of the wind load and the first direction; and
  the wind load exceeds the wind load threshold.

7. The method of claim 1, wherein the method comprises:
determining a total load acting in the first direction, wherein the total load is a sum of the out-of-vertical load and a component of the wind load acting in the first direction;
determining if the total load exceeds a total load threshold; and
controlling the wind turbine to reduce the wind load if the total load exceeds the total load threshold.

8. The method of claim 1, wherein identifying the out-of-vertical load comprises:
monitoring a position of a first point at a base of the wind turbine, and a second point on a nacelle of the wind turbine; and
calculating the out-of-vertical load based on a difference between the position of the first point and the second point.

9. The method of claim 1, wherein identifying the out-of-vertical load comprises determining a vector sum of a plurality of out-of-vertical loads.

10. The method of claim 1, wherein controlling the wind turbine to reduce the wind load comprises adjusting a pitch of at least one blade of the wind turbine.

11. The method of claim 1, wherein controlling the wind turbine to reduce the wind load comprises adjusting a power output by the wind turbine.

12. The method of claim 1, wherein controlling the wind turbine to reduce the wind load comprises:
providing the wind load as an input in a model of expected wind turbine behaviour;
extracting control parameters from the model which reduce the wind load acting on the wind turbine; and
controlling the wind turbine in accordance with the control parameters.

13. A wind turbine control system comprising:
a wind load block configured to determine a wind load acting on a wind turbine;
and a controller configured to receive the wind load from the wind load block;
wherein the controller is configured to control the wind turbine in accordance with an operation, comprising:
identifying an out-of-vertical load acting in a first direction on the wind turbine;
determining a direction of a wind load acting on the wind turbine;
determining whether there is a degree of alignment between the direction of the wind load and the first direction; and
when there is a degree of alignment between the direction of the wind load and the first direction, controlling the wind turbine to reduce the wind load, and
wherein the out-of-vertical load comprises a solar-induced out-of-vertical load caused by solar radiation heating of the wind turbine.

14. The wind turbine control system of claim 13, wherein identifying the out-of-vertical load comprises calculating the solar-induced out-of-vertical load based on a turbine location and current time.

15. The wind turbine control system of claim 14, wherein identifying the out-of-vertical load comprises calculating the solar-induced out-of-vertical load based on a measurement from a meteorological sensor associated with the wind turbine.

16. The wind turbine control system of claim 13, wherein the out-of-vertical load comprises an inherent imbalance acting on the wind turbine.

17. A wind turbine, comprising:
a tower;
a nacelle disposed on the tower, the nacelle housing a generator;
a rotor mechanically coupled to the generator;
a plurality of blades coupled to a distal end of the rotor; and
a wind turbine control system configured to perform an operation, comprising:
identifying an out-of-vertical load acting in a first direction on the wind turbine;
determining a direction of a wind load acting on the wind turbine;
determining whether there is a degree of alignment between the direction of the wind load and the first direction; and
when there is a degree of alignment between the direction of the wind load and the first direction, controlling the wind turbine to reduce the wind load, and
wherein the out-of-vertical load comprises a solar-induced out-of-vertical load caused by solar radiation heating of the wind turbine.

18. The wind turbine of claim 17, wherein the solar-induced out-of-vertical load is calculated by:
determining a temperature increase of radiated parts of the tower over an ambient temperature;
determining an expansion of the radiated parts of the tower based on thermal expansion properties of material of the tower; and
determining a resultant curvature of the tower based on the expansion of the radiated parts.

19. The method of claim 1, wherein the solar-induced out-of-vertical load is calculated by:
determining a temperature increase of radiated parts of a tower of the wind turbine over an ambient temperature;
determining an expansion of the radiated parts of the tower based on thermal expansion properties of material of the tower; and
determining a resultant curvature of the tower based on the expansion of the radiated parts.

20. The wind turbine control system of claim 13, wherein the solar-induced out-of-vertical load is calculated by:
determining a temperature increase of radiated parts of a tower of the wind turbine over an ambient temperature;
determining an expansion of the radiated parts of the tower based on thermal expansion properties of material of the tower; and
determining a resultant curvature of the tower based on the expansion of the radiated parts.

* * * * *